United States Patent
Chen et al.

(10) Patent No.: US 10,425,374 B2
(45) Date of Patent: Sep. 24, 2019

(54) ROUTING A MESSAGE BASED UPON USER-SELECTED TOPIC IN A MESSAGE EDITOR

(71) Applicant: International Business Machines Corporation, Armonk, NY (US)

(72) Inventors: Li-Ju Chen, Taipei (TW); Yi-Hsin Cheng, New Taipei (TW); Jeff H C Kuo, Taipei (TW); Ming Tung Lau, Hong Kong (CN); Wai Man Lee, Hong Kong (CN); Chih-Wen Su, Taipei (TW); Ying-Chen Yu, Taipei (TW)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 817 days.

(21) Appl. No.: 14/382,055

(22) PCT Filed: Apr. 10, 2013

(86) PCT No.: PCT/CN2013/073997
§ 371 (c)(1),
(2) Date: Aug. 29, 2014

(87) PCT Pub. No.: WO2014/000493
PCT Pub. Date: Jan. 3, 2014

(65) Prior Publication Data
US 2015/0026274 A1    Jan. 22, 2015

(30) Foreign Application Priority Data

Jun. 26, 2012  (CN) .......................... 2012 1 0216088

(51) Int. Cl.
*H04L 12/58*    (2006.01)

(52) U.S. Cl.
CPC .............. *H04L 51/28* (2013.01); *H04L 51/14* (2013.01)

(58) Field of Classification Search
None
See application file for complete search history.

(56) References Cited

U.S. PATENT DOCUMENTS

| 6,938,068 B1* | 8/2005 | Kraft ...................... G06Q 10/10 709/203 |
| 7,181,518 B1* | 2/2007 | Matsumoto ............. H04L 51/34 709/203 |

(Continued)

FOREIGN PATENT DOCUMENTS

| CN | 1953426 A | 4/2007 |
| CN | 103516608 A | 1/2014 |
| WO | 0008570 A1 | 2/2000 |

OTHER PUBLICATIONS

Kanuka, H. et al., "Online Social Interchange, Discord, and Knowledge Construction," Int'l. Journal of E-Learning & Distance Education, vol. 13, No. 1, pp. 57-74, 2007.

(Continued)

*Primary Examiner* — Joshua Joo
(74) *Attorney, Agent, or Firm* — Cuenot, Forsythe & Kim, LLC

(57) ABSTRACT

Routing a message to a recipient based on a topic associated with the message may include: receiving a message lacking a recipient address; searching for at least one recipient address based on a topic associated with the message; and sending the message to the at least one recipient address.

14 Claims, 12 Drawing Sheets

(56) References Cited

U.S. PATENT DOCUMENTS

| | | | |
|---|---|---|---|
| 7,571,212 B2 | 8/2009 | Reynolds et al. | |
| 8,112,478 B2 | 2/2012 | Carrer et al. | |
| 2003/0105826 A1* | 6/2003 | Mayraz | G06F 17/30867 709/206 |
| 2004/0083269 A1 | 4/2004 | Cummins | |
| 2004/0111467 A1 | 6/2004 | Willis | |
| 2006/0085504 A1 | 4/2006 | Yang et al. | |
| 2007/0078803 A1* | 4/2007 | Gilmour | G06F 17/30864 |
| 2007/0088711 A1 | 4/2007 | Craggs | |
| 2007/0162547 A1 | 7/2007 | Ross | |
| 2008/0208975 A1* | 8/2008 | Olive | G06F 17/30861 709/205 |
| 2008/0215541 A1* | 9/2008 | Li | G06F 17/30864 |
| 2009/0049140 A1 | 2/2009 | Stoddard et al. | |
| 2009/0055481 A1* | 2/2009 | Carmel | G06Q 10/107 709/206 |
| 2009/0177649 A1* | 7/2009 | Hsieh | G06F 17/30634 |
| 2009/0249198 A1* | 10/2009 | Davis | G06F 17/276 715/261 |
| 2009/0271490 A1* | 10/2009 | Seitz | H04L 51/28 709/206 |
| 2009/0292680 A1* | 11/2009 | Sabnani | G06Q 10/107 |
| 2010/0017194 A1* | 1/2010 | Hammer | G06F 17/2785 704/9 |
| 2011/0040846 A1* | 2/2011 | Weinryb | G06Q 10/107 709/206 |
| 2011/0219115 A1 | 9/2011 | Capel et al. | |
| 2012/0016982 A1 | 1/2012 | Bhatti et al. | |
| 2012/0095977 A1* | 4/2012 | Levin | G06Q 30/02 707/706 |
| 2015/0039705 A1* | 2/2015 | Kursun | H04L 51/26 709/206 |

OTHER PUBLICATIONS

Buike, R., "Sending Email Without a Client," MSExchange.org, Mar. 2, 2006, retrieved from the Internet: <http://www.msexchange.org/articles-tutorials/exchange-server-2003/tools/Sending-Email-without-Client.html>, 4 pg.

WIPO Appln. PCT/CN2013/073997, International Search Report, dated Jul. 11, 2013, 3 pg.

WIPO Appln. PCT/CN2013/073997, Written Opinion, dated Jul. 11, 2013, 4 pg.

\* cited by examiner

| Recipient: | Enter your topic |
| Cc: | Enter your topic |
| Topic: | Enter your topic |
| Subject: | Enter a summary |

Content

Enter details of a discussion/ question

[ Save ]  [ Send ]  [ Cancel ]

Figure 4

```
{   {   keywords: "Pakistan, hiking, and photography gears"
        , SMTP:
[ "Pakistan+hiking+photography+gears@localdomain.com"
        , "Pakistan+hiking+photography+gears@externaldomain1.com"
        , "Pakistan+hiking+photography+gears@externaldomain2.com"]
        , FORUM:
[ "https://foruma.com/board.php?guid=1234"
        , "https://forumb.com/board.php?guid=4566"]
    }
}
```

Email Envelop :

===========

MAIL FROM: <wmlee@hk1.ibm.com>

RCPT TO: <Pakistan+hiking+photography+gears@lotuslive.com>

Email Body :

===========

Subject: Pakistan hiking gears

Topic: Pakistan+hiking+photography+gears@lotuslive.com,

Pakistan+hiking+photography+gears@ibm.com

X-Mailer: Lotus Notes Release 8.5.2 August 10, 2010

From: Raymond WM Lee <wmlee@hk1.ibm.com>

Message-ID:

<OF5B528509.62CEE3F2-ON48257A14.0010F1F4-48257A14.00119C66@hk1.ibm.com>

Date: Tue, 5 Jun 2012 11:12:44 +0800

Hello all,

I am a Chinese living in Hong Kong and I am going for a hiking trip to Pakistan in May and I would like to know some tips for hiking and taking wildlife photography. Any info related to hiking gears, photographic gears, and scenic spots will be highly appreciated!

Regards,

[Sender's name]

Figure 7

Email Envelop:
============

MAIL FROM: <wmlee@hk1.ibm.com>

RCPT TO: <victort@lotuslive.com>

RCPT TO: <joew@lotuslive.com>

RCPT TO: <oliveryip@lotuslive.com>

```
topic            = "Topic:" mailbox-list CRLF                              1300
mailbox-list     = (mailbox *("," mailbox))
mailbox          = addr-spec
addr-spec        = local-part @ domain-part as defined by RFC 821,
2821 and 5321
local-part       = (keyword *("+" keyword))
keyword          = *uchar
uchar            = unreserved
unreserved       = lowalpha | hialpha | digit | escape
Lowalpha         = "a"|"b"|...|"z"
hialpha          = "A"|"B"|... |"Z"
digit            = "0"|"1"|"2"|"3"|"4"|"5"|"6"|"7"|"8"|"9"
escape           = "%"
```

Figure 13

```
S: 220 Go ahead.
C: EHLO domain.com
S: 250-example.com ESMTP
S: 250-TOPIC,STARTTLS << The present of TOPIC indicates that the        1400
SMTP server supports TOPIC as a SMTP extension
S: 250 HELP
```

ROUTING A MESSAGE BASED UPON USER-SELECTED TOPIC IN A MESSAGE EDITOR

BACKGROUND

At present, in the Internet field, message routing is implemented based on the address of a recipient in the Internet.

With electronic mail (email) as an example, when a user composes an email, entry of an email address of the recipient in a recipient field is required, such that the recipient can receive the email. With Instant Messaging Software as an example, a user first needs to add a registration number of another user as a friend, and then the two parties can perform instant communications.

SUMMARY

An embodiment of the present invention includes a method. The method includes receiving a message lacking a recipient address and searching, using a processor, for at least one recipient address based on a topic associated with the message. The method further includes sending the message to the at least one recipient address.

Another embodiment of the present invention includes a system. The system includes at least one processor programmed to initiate executable operations. The executable operations include receiving a message lacking a recipient address, searching for at least one recipient address based on a topic associated with the message, and sending the message to the at least one recipient address.

Another embodiment of the present invention includes a computer program product including a computer readable storage medium having program code stored thereon. The program code is executable by a processor to perform a method. The method includes receiving, using the processor, a message lacking a recipient address and searching, using the processor, for at least one recipient address based on a topic associated with the message. The method further includes sending, using the processor, the message to the at least one recipient address.

BRIEF DESCRIPTION OF THE SEVERAL VIEWS OF THE DRAWINGS

Through the more detailed description of example embodiments of the present disclosure in the accompanying drawings, objects, features and advantages of the present disclosure will become more apparent, wherein the same reference generally refers to the same components in the example embodiments of the present disclosure.

FIG. 4 shows a schematic screenshot of a message editor according to one embodiment of the present invention;

FIG. 7 shows examples of an envelope and body of an email sent to an external recipient server according to one embodiment of the present invention;

FIG. 13 shows a schematic diagram of a code segment for extending RFC (Request For Comments) 5322 (Simple Mail Transfer Protocol (SMTP)) to implement the embodiments of the present invention;

FIG. 14 shows a schematic diagram of a definition code segment for a TOPIC which is required to be registered with an Internet Assigned Numbers Authority (IANA) SMTP extension registry for extending the RFC 5322 as shown in FIG. 13.

DETAILED DESCRIPTION

Figure 1:
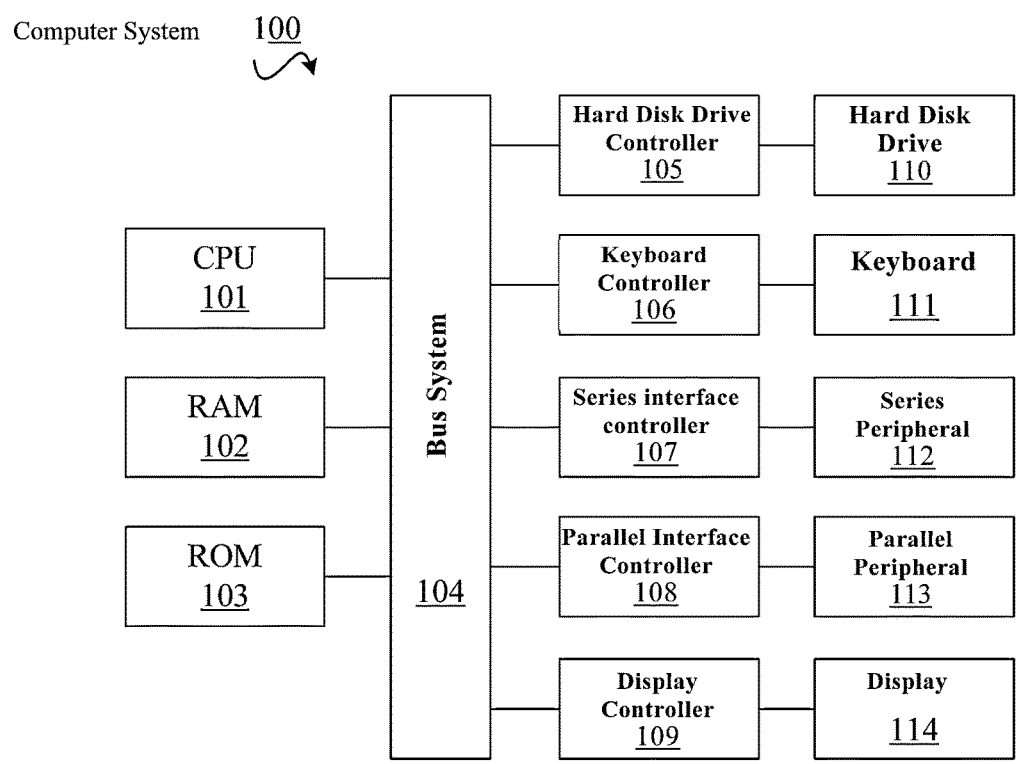
FIG. 1 shows an exemplary computer system which is applicable to implement the embodiments of the present invention.

Embodiments of the present invention relate to the field of information technology and, more specifically, to a method and apparatus for routing a message.

Message routing based on the recipient address has many limitations. For example, such methods require that a user know the recipient address of another Internet user in advance when the user contacts the other Internet user. In many cases, this method is problematic for the user when the user does not know which users to contact and thus does not know the recipient addresses of these users.

For example, if a user wants to know information about Pakistan hiking and photography gears, a usual practice is to search in an Internet tool for keywords such as Pakistan, hiking, photography, and gear or a combination thereof, or to send a message (for example, an electronic mail (email) or instant message) to a user who has a similar experience. A drawback of the first practice lies in that the user has to select useful information from mass information, which is time-consuming and troublesome. A drawback of the second practice is that the user does not know which users have the similar experience and might not know the recipient addresses of these users.

In order to at least partly overcome the above problems, embodiments of the present invention provide a totally different technology for routing a message to a recipient based on a topic associated with the message.

Specifically, according to one aspect of the present invention, there is provided a method for routing a message. For example, the method may include: receiving a message lacking a recipient address, searching for at least one recipient address based on a topic associated with the message, and sending the message to the at least one recipient address.

According to another aspect of the present invention, there is provided an apparatus for routing a message. For example, the apparatus may include: a receiving device configured to receive a message lacking a recipient address; a searching device configured to search for at least one recipient address based on a topic associated with the message, and a sending device configured to send the message to the at least one recipient address.

By using several embodiments of the present invention, a user who initiates a message can route the message to be sent to an appropriate recipient despite not knowing the recipient address. Thus, a novel message routing technology is provided in the message routing field of the Internet. In addition, it seems that this process has no difference from a traditional messaging method from the perspective of a user and, thus, eliminates the trouble of the user having to know the recipient address in advance, thereby bringing convenience to the user.

Embodiments of the present disclosure will be described in more detail with reference to the accompanying drawings, in which the embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and to completely convey the scope of the present disclosure to those skilled in the art.

FIG. 1 shows an exemplary computer system 100 which is applicable to implement the embodiments of the present invention. As shown in FIG. 1, the computer system 100 may include: CPU (Central Process Unit) 101, RAM (Random Access Memory) 102, ROM (Read Only Memory) 103, System Bus 104, Hard Disk Drive Controller 105, Keyboard Controller 106, Serial Interface Controller 107, Parallel Interface Controller 108, Display Controller 109, Hard Drive 110, Keyboard 111, Serial Peripheral Equipment 112, Parallel Peripheral Equipment 113 and Display 114. Among the above devices, CPU 101, RAM 102, ROM 103, Hard Disk Drive Controller 105, Keyboard Controller 106, Serial Interface Controller 107, Parallel Interface Controller 108 and Display Controller 109 are coupled to the System Bus 104. Hard Disk Drive 110 is coupled to Hard Disk Drive Controller 105. Keyboard 111 is coupled to Keyboard Controller 106. Serial Peripheral Equipment 112 is coupled to Serial Interface Controller 107. Parallel Peripheral Equipment 113 is coupled to Parallel Interface Controller 108. And, Display 114 is coupled to Display Controller 109. It should be understood that the structure as shown in FIG. 1 is only for exemplary purposes and not as a limitation of the present invention. In some cases, some devices may be added to or removed from the computer system 100 based on specific situations.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.), or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated data signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for the present invention may be written in any combination of one or more programming languages, including an object oriented programming language such as Java, Smalltalk, C++ or the like and conventional procedural programming languages, such as the "C" programming language or similar programming languages. The program code may execute entirely on the subscriber's computer, partly on the subscriber's computer, as a stand-alone software package, partly on the subscriber's computer and partly on a remote computer or entirely on the remote computer or server. In the latter scenario, the remote computer may be connected to the subscriber's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the computer program instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer, other programmable data processing apparatus, or other devices to cause a series of operational steps to be performed on the computer, other programmable data processing apparatus or other devices to produce a computer implemented process such that the instructions which execute on the computer or other programmable apparatus provide processes for implementing the functions/acts specified in the flowchart and/or block diagram block or blocks.

Hereinafter, several embodiments of a method for routing a message according to the present invention will be described with reference to FIGS. 2-14. In the several embodiments as described in FIGS. 2-14, an email is used as an example of a message to be routed. However, those skilled in the art would appreciate that the message routing principle as described herein may be applied to any type of network messages, for example, messages in instant communications. Thus, the present invention is not limited to the enumerated embodiments related to an email. Furthermore, in the embodiments as described hereinafter, the message recipient as mentioned may be either a user of an email system or an unspecific user of a forum. Apparently, those skilled in the art should understand that the two types of users are only exemplary, without constituting a limitation to the present invention.

Figure 2:
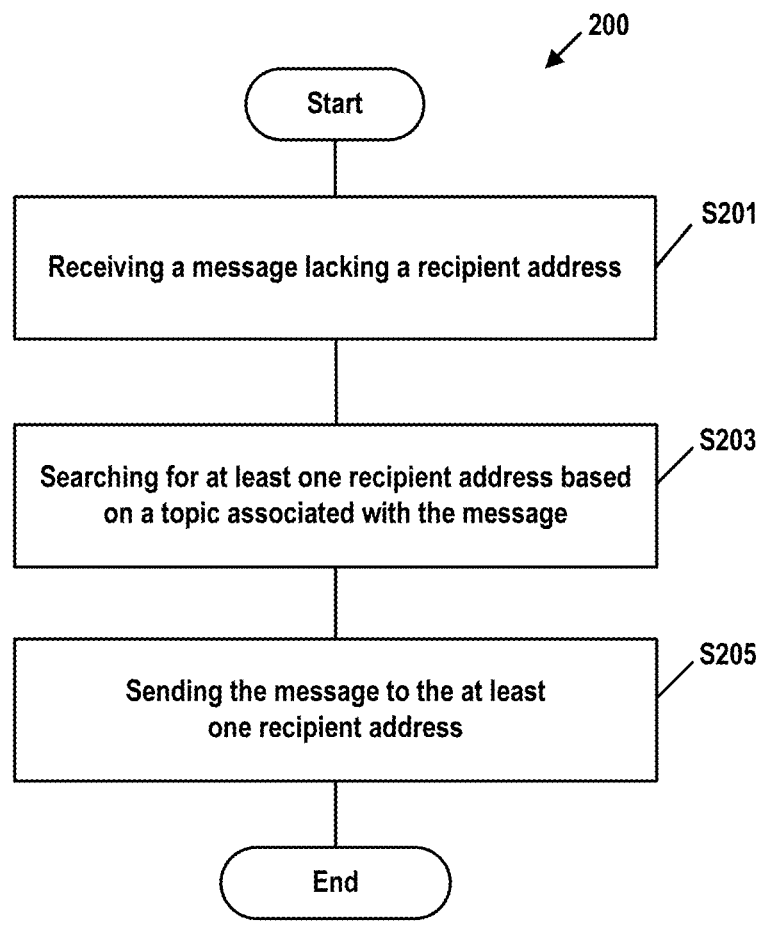
FIG. 2 shows a flowchart of a method for routing a message according to example embodiments of the present invention.

FIG. 2 shows a flowchart of a method 200 for routing a message according to an exemplary embodiment of the present invention. As illustrated in FIG. 2, after the method 200 starts, in step S201, a message lacking a recipient address is received (examples related to the message obtaining will be described hereinafter with reference to FIGS. 3-6). Then, in step S203, the method 200 searches for at least one recipient address (which will also be described in detail with an example) based on a topic associated with the message (examples related to the topic and topic obtaining will also be described in detail with reference to FIGS. 3-6). Next, in step S205, the method 200 sends the message to the at least one recipient address.

Figure 3:
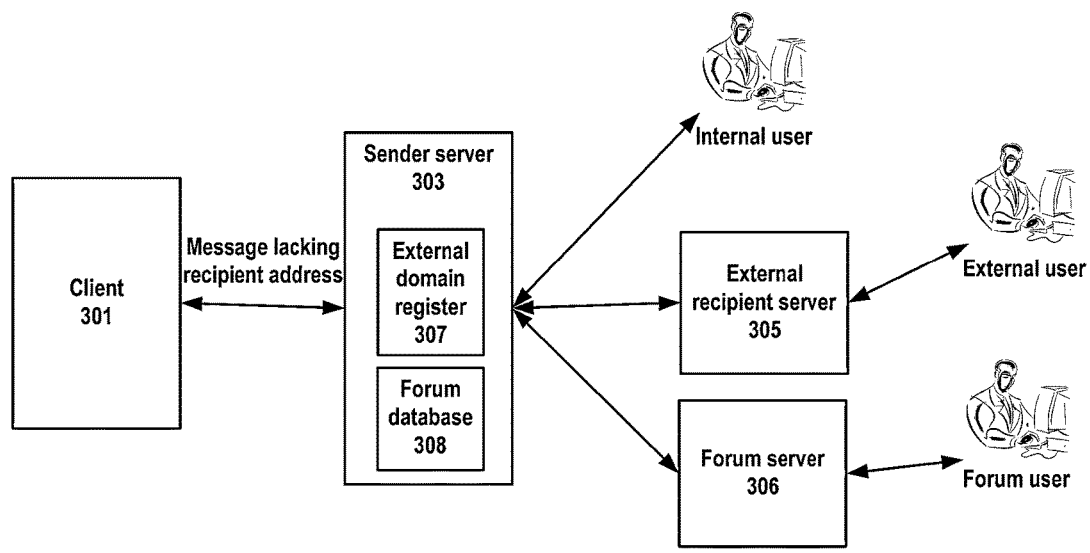
FIG. 3 shows a schematic block diagram of a system architecture for implementing the method shown in FIG. 2.

FIG. 3 shows a schematic block diagram of a system architecture for implementing the method of FIG. 2. As shown in FIG. 3, for example, the message lacking a recipient address may be generated at a client 301 (for example, it may be generated by a message editor (as shown in FIG. 4) editing a message). Then, the client 301 sends the message to a sender server 303. The sender server 303, after receiving the message lacking a recipient address, obtains at least one recipient address through some processing (for example, analysis of a user profile as described hereinafter) based on a topic associated with the message. Next, with the at least recipient address as an addresser address respectively, the foregoing message or contents of the foregoing message is sent to the at least one recipient address.

In the embodiment shown in FIG. 3, dependent on the manner or location in which the at least one recipient address is parsed out, a user having the at least one recipient address may be called respectively as an internal user, an external user, or a forum user. For example, if the at least one recipient address is parsed out in an internal domain where the sender server 303 is located, the user having the at least one recipient address may be called an internal user. If the at least one recipient address is parsed out in an external domain where an external recipient server 305 is located, the user having the at least one recipient address may be called an external user. If the at least one recipient address is parsed out in an internal domain or an external domain where a forum server 306 is located, the user having the at least one recipient address may be called a forum user.

In the embodiment shown in FIG. 3, the sender server 303 may obtain information (for example, IP addresses of external domains) regarding one or more external domains (for example, one or more email servers in the one or more external domains) pre-registered in the sender server 303 by searching an external domain register 307. In this embodiment, if an external partner located in the external domain (for example, externaldomain.com) wishes to receive from the sender server 303 located in the internal domain (for example, internaldomain.com) an improved email according to several embodiments of the present invention, for example, an email with the recipient address being "topic@externaldomain.com", it is required to pre-register essential information (for example, its domain name "externaldomain.com") of the external partner in the internal domain, for example, in the sender server 303 or a device associated with the sender server 303. In one embodiment, such information as the external domain of the external partner is pre-registered in an external domain register 307. The external domain register 307 may be located internally or externally to the sender server 303, and it may be located locally or remotely.

In the case where one or more registered (e.g., pre-registered in the internal domain by any online or offline manner) external domains (for example, email servers in the external domain) are found, the sender server 303 may send the aforementioned message or improved message (hereinafter, an envelope example and body example when such message is an email will be described with reference to FIG. 7) to one or more external recipient servers 305 corresponding to the one or more registered external domains. Then, the one or more external recipient servers 305 obtain at least one recipient address based on a topic associated with the message through processing similar to the aforementioned (for example, analysis of a user profile as mentioned hereinafter). Next, the aforementioned message or contents of the message is sent to the at least one recipient address with the at least one recipient address as the addresser address respectively.

Further, it should be understood that, broadly speaking, the network address or relevant information (for example, the aforementioned topic@externaldomain.com) of the one or more external recipient servers 305 in the above example may be regarded as the at least one recipient address in the above example.

Figure 10:
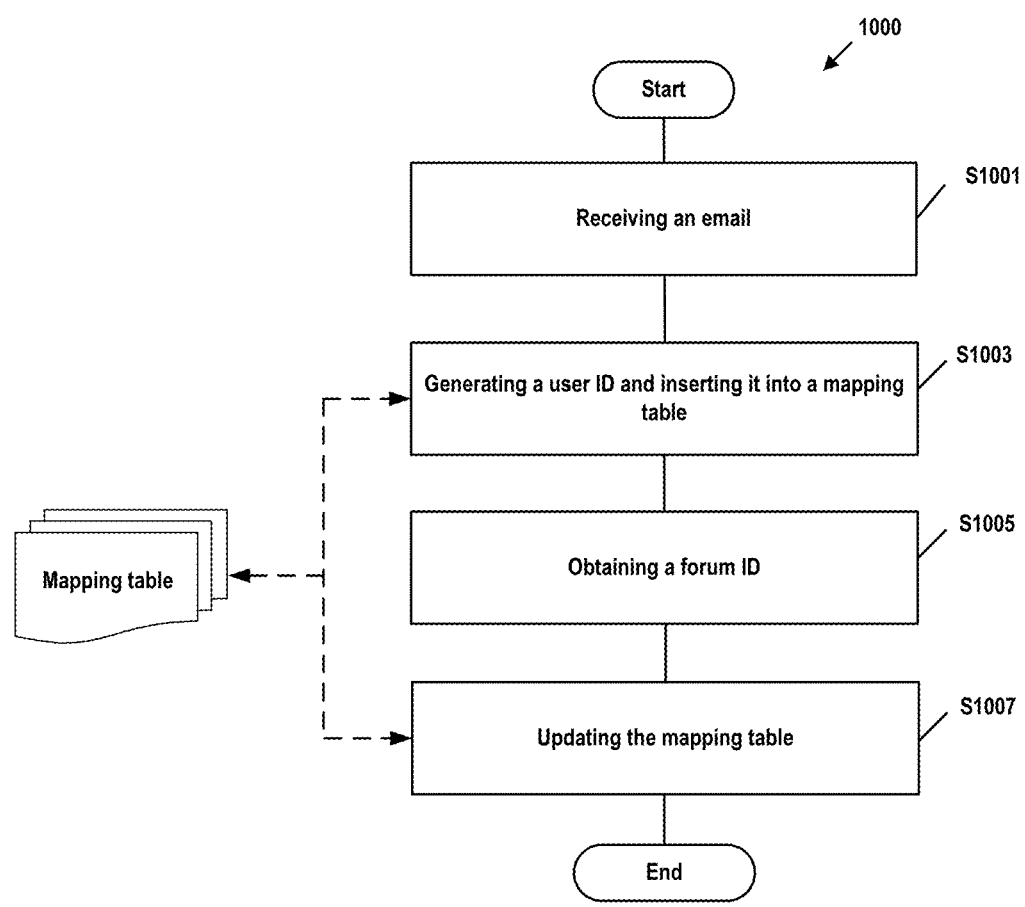
FIG. 10 shows a flowchart of an example method for a posting process executed by a forum server according to one embodiment of the present invention.

In the embodiment shown in FIG. 3, the sender server 303 may obtain one or more of a uniform resource locator, outbound email address and/or address of the network domain of each of one or more network forums by searching a forum database 308 and/or by other manners (which will be described in detail hereinafter). In the case of obtaining one or more of the uniform resource locator, outbound email address and/or address of the network domain of each of the one or more network forums, the sender server 303 sends the aforementioned message or contents of the aforementioned message to one or more forum servers 306 corresponding to the uniform resource locator, outbound email address and/or address of the network domain to which the network forum belongs. Then, the one or more forum servers 305, based on the topic associated with the message, uploads the message or the contents of the message to the forum(s) as posts through the posting process as shown in FIG. 10, for viewing and/or replying by forum users.

The aforementioned message for example may be edited by an initiator (i.e., a user) of the message with a message editor at the client 301 as shown in FIG. 3. FIG. 4 shows a schematic screenshot of one example message editor. It can be seen from FIG. 4 that the example message editor is substantially identical to a traditional message (for example, an email) editor, except an additional topic field available for a user to enter "topic" is included. Those skilled in the art will appreciate that it is also possible not to include the topic field as shown in FIG. 4, but just to simply extend the contents that can be entered into other fields (for example, recipient, carbon copy (cc), subject, or body) to include the "topic." It is only for the purpose of drawing convenience that FIG. 4 shows the two manners simultaneously. FIG. 4 is not intended to imply that the two manners have to be present at the same time. It should be noted that the term "topic" here may be keywords for identifying the contents in the message body. In one example, the topic may adopt the form of "topic@domain.com," for example, Pakistan+hiking+photography+gears@ibm.com.

Those skilled in the art will appreciate that if the initiator of a message provides a topic of the message in the topic field in the interface as shown in FIG. 4, the sender server 303 (for example, a sender email server) having received the message as shown in FIG. 3 may directly extract the topic from the topic field included in the message. If the message initiator enters contents into the subject field, recipient field, cc field or body portion of the message in the interface shown in FIG. 4, the sender server 303 shown in FIG. 3 analyzes the contents in these fields to thereby obtain the topic of the message. It should be noted that any technique for extracting a topic associated with the message from the contents of a message can be applied to implement the embodiments of the present invention, and the present invention is not limited in this aspect.

In some embodiments of the present invention, the message editor as shown in FIG. 4 may be appropriately amended, such that during the editing of the message, the message editor may interact with the sender server 303. During this interaction, the sender server 303 may perform analysis similar to the aforementioned analysis based on the contents entered by the user through a message editor, then provide one or more candidate topics, and return these candidate topics to the message editor, so that the message editor may display these candidate topics, which allows the user to select one or more of the candidate topics. It should be appreciated that these candidate topics may be stored and pre-defined topics obtained based on historical topic data. These candidate topics may be stored in the sender server 303 as shown in FIG. 3 or stored in any near-range or remote storage medium accessible to the sender server 303. In one example, a topic subscription subsystem (which may be located internally or externally to the sender server 303) is used to manage historical topics and newly generated topics.

After the user editing the aforementioned message selects any topic from one or more candidate topics (for example, the selected candidate topic may be automatically or manually added into the topic field), the edited message is sent to the sender server 303 by the client 301. The sender server 303 may extract the topic from the received message (for example, from the topic field).

Figures 5, 6:
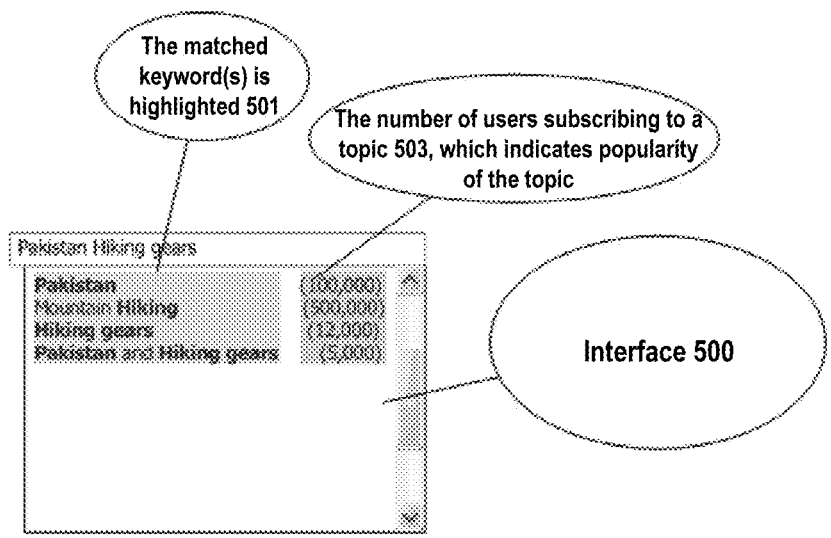
FIG. 5 shows a schematic diagram of a candidate topic prompt interface according to one embodiment of the present invention.
FIG. 6 shows a schematic diagram of a code segment of a candidate topic according to one embodiment of the present invention.

FIG. 5 shows a schematic diagram of a candidate topic prompt interface according to one embodiment of the present invention. The client 301 shown in FIG. 3 or the message editor shown in FIG. 4 may display to the user editing the message one or more candidate topics provided by the sender server 303 according to the interface as shown in FIG. 5 or a similar interface. In the interface 500 as shown in FIG. 5, keyword(s) 501 (i.e., topic, for example, Pakistan, Hiking, Hiking gears) matching the analyzed topic are highlighted. The interface 500 as shown in FIG. 5 further displays the number(s) 503 of users having subscribed to these topics. The number 503 of users may reflect popularity of a corresponding topic. Based on the aforementioned or similar information provided in the interface 500, the user editing the message may select (for example, by clicking a mouse) one or more topics and automatically or manually add the selected one or more topics into the topic field shown in FIG. 4.

FIG. 6 shows an example of topic data according to one embodiment of the present invention. In the example shown in FIG. 6, the keywords are "Pakistan, hiking, and photography gears." Thus, the topic data of a historic topic retrieved from the topic subscription subsystem or newly created topic data may be Pakistan+hiking+photography+gears@localdomain.com, Pakistan+hiking+photography+gears@externaldomain1.com, etc. (e.g. in the case that the recipient is an internal email user or an external email user), or https://foruma.com/board. php?guid=1234, etc. (e.g. in the case that the recipient is a forum user).

In one example, if the user selects a topic, the method 200 as shown in FIG. 2 or the sender server 303 as shown in FIG. 3 may be based on the topic, update at least one of the number of users associated with the selected at least one candidate topic (i.e., the popularity of the topic) and/or an activity degree indication of the topic. It should be appreciated that the number of users and the activity degree indication may facilitate the user editing the message to make a more reasonable selection for the candidate topic. For example, if a topic with a higher activity degree is selected, the probability that the user can get a reply is higher.

Hereinafter, it will be described how to obtain at least one recipient address based on a topic in an example embodiment of the present invention. For an internal user exemplarily shown in FIG. 3, in one example, the sender server 303 analyzes the contents (for example, interest, hobby, aptitude, specialty) in a user profile of one or more registered users in an internal network, so as to determine association degree between the user and the contents of a topic. In the case that the association degree of the analyzed user with the topic is higher than a first predetermined threshold, the email address of the user is selected as one of at least one recipient address. It should be understood that respective thresholds in various embodiments of the present invention may be represented for example by numbers, which represent filtering threshold values for certain one or some parameters. The values may be determined based on statistics and may be adjusted statically or dynamically. For example, the user profile of user A describes that his/her specialty includes hiking gears. Suppose in this example, the first predetermined threshold is 0.5 (i.e., it is only required that half of the words match), then the user A may be regarded to be associated with the topic (Pakistan Hiking Gears), and his/her address usernameA@ibm.com may be selected as the recipient address. Those skilled in the art would appreciate that the first predetermined threshold here may be set by the manager or other management staff of the sender server 303, and the present invention has no limitation in this aspect. There are a plurality of feasible methods regarding how to determine the association degree between the contents of two segments (for example, the text, picture, video, audio etc. included in the user profile, and the text in the topic field). For example, for the texts of two segments, the association degree between the texts of two segments may be determined through a simple text matching method. It should be noted that how to determine the association degree between the contents of two segments does not constitute a limitation to the present invention.

Figures 8, 9:
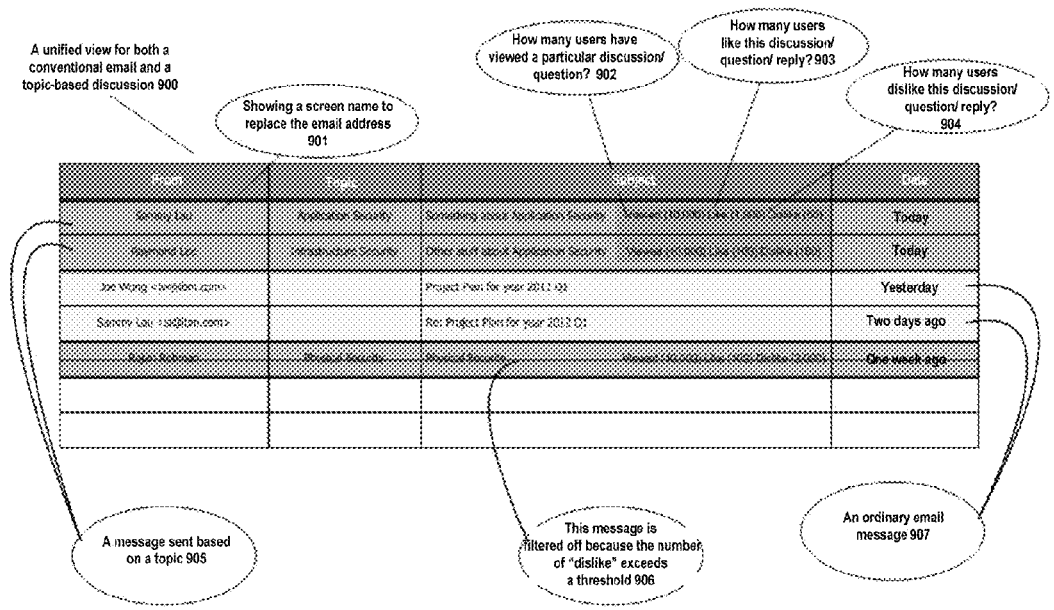
FIG. 8 shows an example of an envelope of an electronic mail (email) sent from a recipient server to an internal user according to one embodiment of the present invention.
FIG. 9 shows a schematic diagram of a uniform message interface including a conventional email and a topic-based discussion according to example embodiments of the present invention.

In the aforementioned case where the obtained at least one recipient address is an email address, the sender server 303 updates an email envelope of the message to be sent using the aforementioned at least one recipient address (the updated email envelope, for example as shown in FIG. 8). Then, the sender server 303 sends the aforementioned message to the at least one recipient address through a simple mail transfer protocol according to the updated email envelope.

For the external user as exemplarily shown in FIG. 3, the sender server 303 may send an email with the email envelope and body as exemplarily shown in FIG. 7 to the external recipient server 305. The corresponding external recipient server 305, after receiving the email, analyzes the contents (for example, interest, hobby, aptitude, specialty) in a user profile of one or more registered users in its internal network (which is an external network with respect to the sender server 303) so as to determine association degree of the user with the contents of a topic. In the case where the analyzed association degree of the user with the topic is higher than a first predetermined threshold, the email address of the user is selected as one of the at least one recipient address. Other processing is similar to the processing regarding an internal user, which is not detailed here.

For the forum user (i.e., an unspecific user of a network forum) as exemplarily shown in FIG. 3, in one example, the sender server 303 as shown in FIG. 3 may analyze one or more keywords of a network forum so as to determine association degree of the network forum with the topic. In the case where the association degree of the network forum with the topic is higher than a second predetermined threshold, the sender server 303 will send a message (or a variant of the message) received from the client 301 to the outbound email address, address of the network domain to which the network forum belongs, and/or uniform resource locator of the network forum. Those skilled in the art will appreciate that the keyword(s) of the network forum and any of the outbound email address, address of the network domain to which the network forum belongs, and uniform resource locator of the network forum may be pre-obtained by for example crawling, and the present invention is not limited in the obtaining manner of these contents. Moreover, after obtaining the above contents, a mapping between the keyword(s) of the network forum and any of the outbound email address, address of the network domain to which the network forum belongs, and uniform resource locator of the network forum is stored (for example, stored in one or more forum databases 308 as shown in FIG. 3).

Preferably, according to some embodiments of the present invention, expiration time may be set for these network forums. After the expiration time expires, the mapping related to the network forum can be deleted. A weight may also be set for the network forum, which indicates the activity degree of the network forum. The value of the weight may be correspondingly updated (for example, increased or decreased) when the sender server 303 receives a reply from the network forum. According to some embodiments of the present invention, a third predetermined threshold may be set for the weight. After the expiration time expires, the mapping of the network forum whose weight is lower than the third predetermined threshold may be deleted. Besides, those skilled in the art will appreciate that similar to the scenario where the recipient is an email user, each predetermined threshold may be set by a manager or other management staff of the sender server 300, and the present invention is not limited in this aspect. Those skilled in the art would further appreciate that the above association degree may be implemented for example through a literal matching method, and the present invention is not limited in the specific matching method.

It should also be noted that the above user profile, user's email address, as well as the keywords of the network forum, one or more of the outbound email address, address of the network domain to which the network forum belongs, and uniform resource locator of the network forum may be stored in the sender server 303 shown in FIG. 3 or stored in any near-range or remote storage medium that is accessible to the sender server 303. In one example, the data related to a forum is stored in the forum database 308. In another example, the data related to an external domain is stored in the external domain register 307. Additionally and alternatively, weights may be stored in association with at least one recipient address. These weights reflect the activity degree of recipient addresses.

Additionally, in one example, the method 200 as shown in FIG. 2 or the sender server 303, the external recipient server 305 and/or the forum server 306 as shown in FIG. 3 may also include adjusting respective weights of at least one recipient address based on a historical reply; and sending the message only to the recipient address whose weight is higher than a fourth predetermined threshold. The fourth predetermined threshold here may also be statically or dynamically updated based on the statistics.

Either the internal user or the external user (collectively called as a recipient) can send and receive an email according to a conventional email transceiving technique. FIG. 9 shows a schematic diagram of a unified message interface including a conventional email and a topic-based discussion according to an example embodiment of the present invention. In the interface 900 as exemplarily shown in FIG. 9, the recipient may simultaneously check a conventional email 907 and an email 905 that is sent based on a topic. Besides, preferably, the interface 900 may also show more information, for example, how many users have viewed a particular discussion/question 902, how many users like this discussion/question/reply 903, how many users dislike this discussion/question/reply 904, and a message is filtered off 906 due to the number of "dislike" exceeding a threshold, etc. And preferably, it is possible to only display a web name 901 of the initiator of the email 905 which is sent based on the topic as well as the arrival date of each email.

In the case where the recipient user is an unspecific user of a forum, the forum server 305 as shown in FIG. 3 may post the email that is sent in a particular format to a corresponding forum in accordance with a conventional "email-post" technology. For example, FIG. 10 shows, in the case that the recipient of a message is a forum, a method flowchart 1000 of a posting process performed by a server of the forum for the received email.

Specifically, the forum server 306 shown in FIG. 3 receives an email from the sender server 303 at step S1001.

Next, in step S1003, a user identification (ID) is generated and inserted into a mapping table (the specific contents of the mapping table will be described with reference to FIG. 12 hereinafter, which correspond to the posts that can be viewed by forum users). Thereafter, in step S1005, a forum ID is obtained. Next, in step S1007, the mapping table may also be updated using the user ID, sender address, topic, forum ID, and parsing state, etc.

Further, the method 200 shown in FIG. 2, the sender server 303, the external recipient server 305 and the forum server 306 shown in FIG. 3 may also receive a reply from at least one recipient address. In the case where the recipient user is an email user, the reply to the message may be transmitted with a conventional technology, which will not be detailed here.

Figure 11:
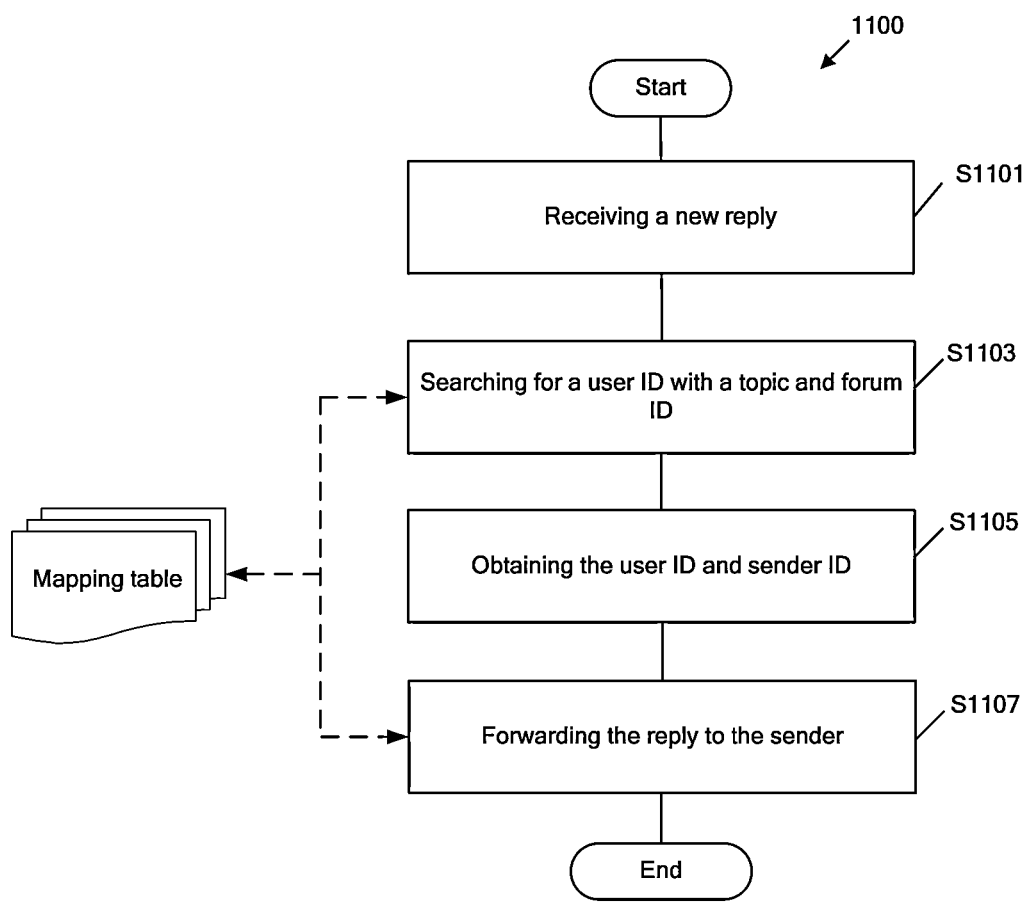
FIG. 11 shows a flowchart of an example method for returning a message reply to a message initiator executed by a forum server according to one embodiment of the present invention.

In addition, in the case where the recipient user is an unspecified user of a forum, it may follow the method flowchart 1100 shown in FIG. 11, which is performed by a forum server for returning the reply of a message to the initiator of the message.

Specifically, the forum server 306, for example, detects an inbound new reply in step S1101. Then, in step S1103, the forum server 306 uses a topic and forum ID to search the mapping table for a user ID. Thereafter, the forum server 306 obtains the user ID and further obtains the sender ID in step S1105. Finally, in step S1107, the forum server 306 forwards the reply to the sender.

Figure 12:
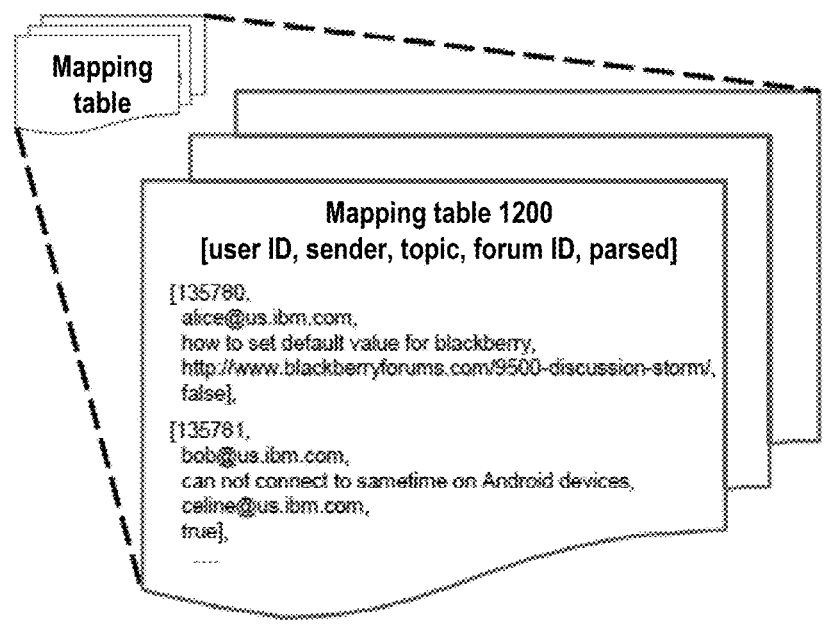
FIG. 12 shows a schematic diagram of contents in a mapping table as stored in a forum database according to one embodiment of the present invention.

The mapping table used in the above process, for example, may be the mapping table shown by a reference numeral 1200 in FIG. 12, which, for example, may include a user ID, sender ID, topic, forum ID, and parsing state (true or false).

The method 200 shown in FIG. 2, the sender server 303, the external recipient server 305, and the forum server 306 shown in FIG. 3 may also filter (for example, as indicated by the reference numeral 906 in FIG. 9) either or both of the message and reply based on evaluation of the message made by the recipient corresponding to the at least one recipient address.

The method 200 shown in FIG. 2, the sender server 303, the external recipient server 305, and the forum server 306 shown in FIG. 3 may also include returning a filtered or unfiltered reply to the initiator of the message, i.e., the client 301 as shown in FIG. 3.

In addition, it should be noted that in the case where the sent message is an email, in order to implement the embodiments of the present invention, it is required to extend RFC 5322 (SMTP) in accordance with the definition as shown in FIG. 13. Here, "topic" 1300 is an SMTP command extension similar to the SMTP command such as "mail from". Moreover, in order to avoid incompatibility with a new SMTP extension, the "topic" should be formally registered with the IANA SMTP extension registry.

FIG. 14 shows an example of SMTP session initiation communications. Here, the existence of "TOPIC" 1400 means that an SMTP server supports TOPIC as an SMTP extension.

In this way, if the SMTP server supports TOPIC, it will accept "topic@domain" as the recipient address (RCPT) in the email envelop.

Figure 15:
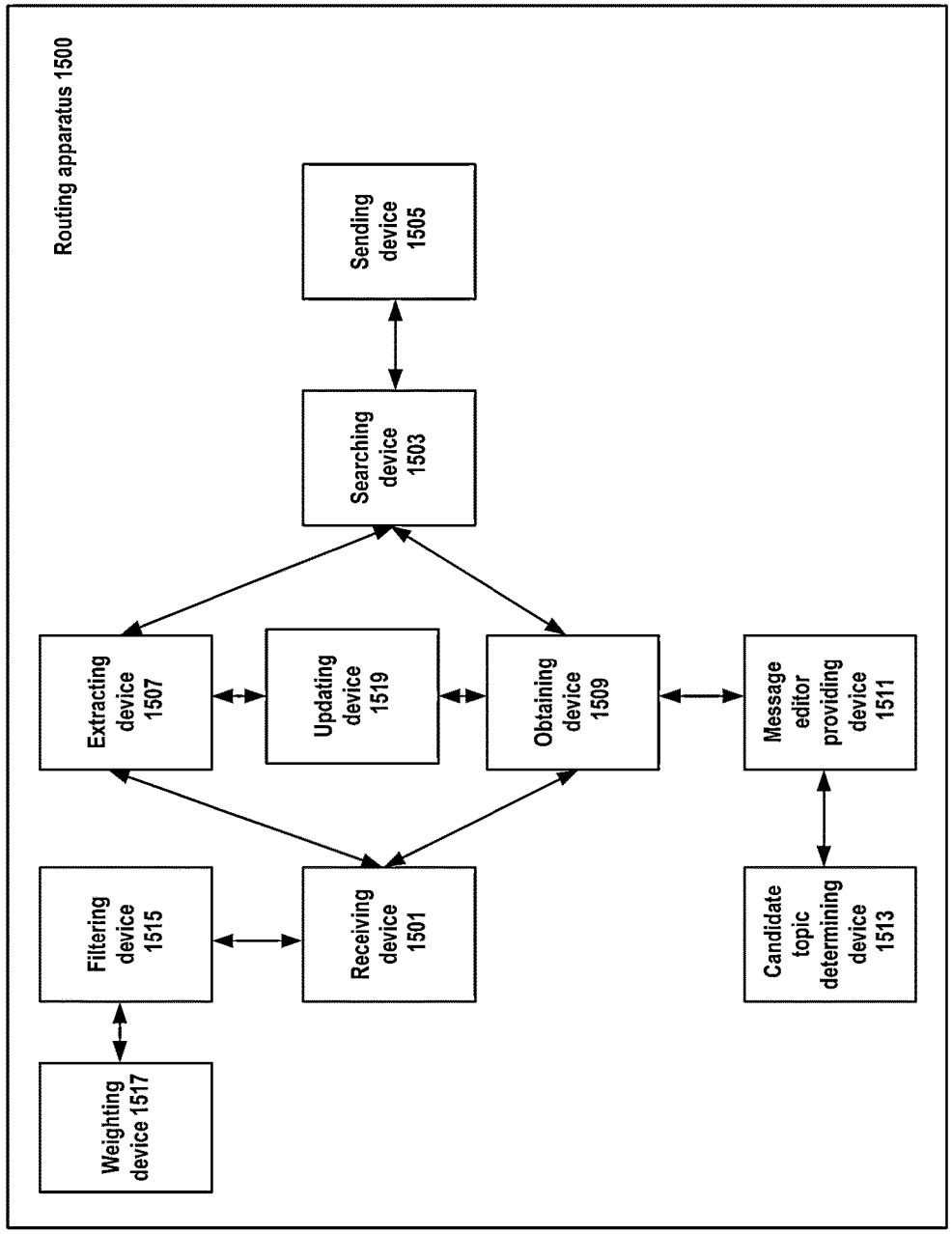
FIG. 15 shows a schematic block diagram of an apparatus for routing a message according to example embodiments of the present invention.

Hereinafter, an apparatus 1500 for routing a message (hereinafter referred to as routing apparatus 1500) according to an example embodiment of the present invention will be described with reference to FIG. 15. The routing apparatus 1500 for example may include: a receiving device 1501 configured to receive a message lacking a recipient address; a searching device 1503 configured to search for at least one recipient address based on a topic associated with the message; and a sending device 1505 configured to send the message to the at least one recipient address.

According to an example embodiment of the present invention, the routing apparatus 1500, for example, may further include an extracting device 1507 configured to extract a topic from a topic field included in the message.

According to an example embodiment of the present invention, the routing apparatus 1500, for example, may further include: an obtaining device 1509 configured to analyze the contents in at least one of a body portion, a subject field, a recipient field, and a cc field of the message so as to obtain the topic.

According to an example embodiment of the present invention, the routing apparatus 1500, for example, may further include a message editor providing device 1511 configured to provide a message editor (whose interface is shown for example in FIG. 4) for editing the aforementioned message; a candidate topic determining device 1513 configured to analyze the contents in at least one of the body portion, the subject field, the recipient field, and the cc field of the aforementioned message so as to determine one or more candidate topics (for example, it may use the aforementioned topic subscription subsystem in combination). Additionally, the aforementioned extracting device 1507 is further configured to receive a selection of at least one said candidate topic and determine the at least one candidate topic as the topic associated with the aforementioned message.

According to an example embodiment of the present invention, the routing apparatus 1500, for example, may further include an updating device 1519 configured to update at least one of a number of users associated with the at least one candidate topic and an activity degree indication of the topic.

According to an example embodiment of the present invention, the message is an email, and the routing apparatus 1500 further includes: a user profile analyzing device configured to analyze a user profile of a registered user in an internal network so as to determine association degree of the user with the topic; and an email address determining device configured to select an email address of the user as one of the at least one recipient address in the case where the association degree is higher than a first predetermined threshold.

According to an example embodiment of the present invention, the message is an email, and the routing apparatus 1500 further includes: a message forwarding device configured to send the message to an external domain server that has been pre-registered in an internal domain; a user profile analyzing device configured to analyze a user profile of a registered user in the external domain so as to determine association degree of the user with the topic; and an email address determining device configured to select an email address of the user as one of the at least one recipient address in the case where the association degree is higher than a first predetermined threshold.

According to an example embodiment of the present invention, the routing apparatus 1500, for example, may further include: a network forum keyword analyzing device configured to analyze keywords of a network forum so as to determine association degree of the network form with the topic; and a forum address determining device configured to select one of an outbound email address, address of a network domain to which the network forum belongs, and uniform resource locator of the network forum as one of the at least one recipient address in the case where the association degree is higher than a second predetermined threshold.

According to an example embodiment of the present invention, the routing apparatus 1500, for example, may further include: a network forum information obtaining device configured to obtain keywords of a network forum and any one of an outbound email address, address of a network domain to which the network forum belongs, and uniform resource locator of the network forum; a network forum mapping storing device configured to store a mapping of the keywords of the network forum with any one of the outbound email address, address of the network domain to which the network forum belongs, and uniform resource locator of the network forum; and a network forum mapping deleting device configured to delete the mapping in response to at least one of (1) expiration time for the mapping being due, and (2) a weight for the mapping being lower than a third predetermined threshold.

According to an example embodiment of the present invention, the receiving device 1501 may be further configured to receive a reply from the at least one recipient address.

According to an example embodiment of the present invention, the routing apparatus 1500, for example, may further include: a filtering device 1515 configured to filter either or both of the message and reply based on evaluation of the message made by a recipient corresponding to the at least one recipient address.

According to an example embodiment of the present invention, the receiving device 1501 is further configured to return a filtered or unfiltered reply to the initiator of the message.

According to an example embodiment of the present invention, the routing apparatus 1500, for example, may further include: a weighting device 1517 configured to adjust respective weights of the at least one recipient address based on a historical reply; and a sending device 1505 further configured to send the message only to a recipient address whose weight is higher than a fourth predetermined threshold.

According to an example embodiment of the present invention, the sending device 1505, for example, may include: a simple mail transfer protocol processing device configured to send the message to the at least one recipient through the simple mail transfer protocol.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, comprising:
providing, in a client computer, a message editor for editing an message;
receiving, in the message editor, a message lacking a recipient address;
identifying a plurality of candidate topics based on analysis of contents in at least one of a body portion, a subject field, a recipient field or a carbon copy field of the message;
providing, to the message editor, the plurality of candidate topics;
receiving, as a topic associated with the message, a selection of one of the plurality of candidate topics;
searching for at least one recipient address based on the topic associated with the message;
sending, using the message editor, the message to the at least one recipient address;
analyzing keywords in a network forum to determine an association degree of the network forum with the topic;
responsive to determining that the association degree is higher than a predetermined threshold, selecting one of an outbound electronic mail address, an address of a network domain to which the network forum belongs, or a uniform resource locator of the network forum as one of the at least one recipient address;
obtaining the keywords of the network forum and any one of the outbound electronic mail address, the address of the network domain to which the network forum belongs, or the uniform resource locator of the network forum;
storing a mapping between the keywords of the network forum and any one of the outbound electronic mail address, the address of the network domain to which the network forum belongs, or the uniform resource locator of the network forum; and
deleting the mapping in response to at least one of an expiration time for the mapping being due, or a weight for the mapping being already lower than a further predetermined threshold.

2. The method according to claim 1, further comprising:
extracting the topic from a topic field included in the message.

3. The method according to claim 1, further comprising:
analyzing contents in at least one of a body portion, a subject field, a recipient field, or a carbon copy field of the message to obtain the topic.

4. The method according to claim 1, wherein
the message is an electronic mail, and the method further comprises:
analyzing a user profile of a registered user in an internal domain to determine a second association degree of the user with the topic; and
responsive to determining that the second association degree is higher than a predetermined threshold, selecting an electronic mail address of the user as one of the at least one recipient address.

5. The method according to claim 1, wherein the message is an electronic mail, and the method further comprises:
sending the message to an external domain server that has been pre-registered in an internal domain;
analyzing a user profile of a registered user in the external domain to determine a second association degree of the user with the topic; and
responsive to determining that the second association degree is higher than a predetermined threshold, selecting an electronic null address of the user as one of the at least one recipient address.

6. The method according to claim 1, further comprising:
receiving a reply from the at least one recipient address; and
filtering at least one of the message or the reply based on evaluation of the message made by a recipient corresponding to the at least one recipient address.

7. The method according to claim 1, further comprising:
adjusting respective weights of the at least one recipient address based on a historical reply; and
sending the message only to a recipient address whose weight is higher than a predetermined threshold.

8. A client computer hardware system, comprising:
at least one processor programmed to initiate executable operations comprising:
providing, in a client computer hardware system, a message editor for editing an message;
receiving, in the message editor, a message lacking a recipient address;
identifying a plurality of candidate topics based on analysis of contents in at least one of a body portion, a subject field, a recipient field or a carbon copy field of the message;
providing, to the message editor, the plurality of candidate topics;
receiving, as a topic associated with the message, a selection of one of the plurality of candidate topics;
searching for at least one recipient address based on the topic associated with the message;
sending, using the message editor, the message to the at least one recipient address;
analyzing keywords in a network forum to determine an association degree of the network forum with the topic;
responsive to determining that the association degree is higher than a predetermined threshold, selecting one of an outbound electronic mail address, an address of a network domain to which the network forum belongs, or a uniform resource locator of the network forum as one of the at least one recipient address;
obtaining the keywords of the network forum and any one of the outbound electronic mail address, the address of the network domain to which the network forum belongs, or the uniform resource locator of the network forum;
storing a mapping between the keywords of the network forum and any one of the outbound electronic nail address, the address of the network domain to which the network forum belongs, or the uniform resource locator of the network forum; and
deleting the mapping in response to at least one of:
an expiration time for the mapping being due, or a weight for the nipping being already lower than a further predetermined threshold.

9. The system according to claim 8, wherein the at least one processor is further programmed to initiate executable operations comprising:
extracting the topic from a topic field included in the message.

10. The system according to claim 8, wherein the at least one processor is further programmed to initiate executable operations comprising:
analyzing contents in at least one of a body portion, a subject field, a recipient field, or a carbon copy field of the message to obtain the topic.

11. The system according to claim 8, wherein the message is an electronic mail, and wherein the at least one processor is further programmed to initiate executable operations comprising:
analyzing a user profile of a registered user in an internal domain to determine a second association degree of the user with the topic; and
responsive to determining that the second association degree is higher than a predetermined threshold, selecting an electronic mail address of the user as one of the at least one recipient address.

12. The system according to claim 8, wherein the message is an electronic mail, and wherein the at least one processor is further programmed to initiate executable operations comprising:
sending the message to an external domain server that has been pre-registered in an internal domain;
analyzing a user profile of a registered user in the external domain to determine a second association degree of the user with the topic; and
responsive to determining that the second association degree is higher than a predetermined threshold, selecting an electronic mail address of the user as one of the at least one recipient address.

13. The system according to claim 8, wherein the at least one processor is further programmed to initiate executable operations comprising:
receiving a reply from the at least one recipient address; and
filtering at least one of the message or the reply based on evaluation of the message made by a recipient corresponding to the at least one recipient address.

14. A computer program product comprising
a computer readable hardware storage device having program code stored thereon,
the program code executable by a processor to perform:
providing, in a client computer hardware system, a message editor for editing an message;
receiving, in the message editor, a message lacking a recipient address;
identifying a plurality of candidate topics based on analysis of contents in at least one of a body portion, a subject field, a recipient field or a carbon copy field of the message;
providing, to the message editor, the plurality of candidate topics;
receiving, as a topic associated with the message, a selection of one of the plurality of candidate topics;
searching for at least one recipient address based on the topic associated with the message;
sending, using the message editor, the message to the at least one recipient address;
analyzing keywords in a network forum to determine an association degree of the network forum with the topic;
responsive to determining that the association degree is higher than a predetermined threshold, selecting one of an outbound electronic mail address, an address of a network domain to which the network forum belongs, or a uniform resource locator of the network forum as one of the at least one recipient address;

obtaining the keywords of the network forum and any one of the outbound electronic mail address, the address of the network domain to which the network forum belongs, or the uniform resource locator of the network forum;

storing a mapping between the keywords of the network forum and any one of the outbound electronic mail address, the address of the network domain to which the network forum belongs, or the uniform resource locator of the network forum; and deleting the mapping in response to at least one of:

an expiration time for the mapping being due, or a weight for the mapping being already lower than a further predetermined threshold.

\* \* \* \* \*